United States Patent
Medithe et al.

(10) Patent No.: US 11,716,240 B2
(45) Date of Patent: Aug. 1, 2023

(54) METHOD, DEVICE AND COMPUTER PROGRAM PRODUCT FOR ANOMALY DETECTION

(71) Applicant: RAKUTEN MOBILE, INC., Tokyo (JP)

(72) Inventors: Madhukiran Medithe, Tokyo (JP); Manoj Kumar, Tokyo (JP); Petrit Nahi, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/481,260

(22) Filed: Sep. 21, 2021

(65) Prior Publication Data

US 2023/0091638 A1    Mar. 23, 2023

(51) Int. Cl.
| | |
|---|---|
| *H04L 41/0631* | (2022.01) |
| *H04W 36/30* | (2009.01) |
| *H04W 28/04* | (2009.01) |
| *H04W 72/23* | (2023.01) |
| *H04W 72/54* | (2023.01) |

(52) U.S. Cl.
CPC ......... *H04L 41/0631* (2013.01); *H04W 28/04* (2013.01); *H04W 36/305* (2018.08); *H04W 72/23* (2023.01); *H04W 72/54* (2023.01)

(58) Field of Classification Search
CPC ............. H04L 41/0631; H04W 28/04; H04W 36/305; H04W 72/042; H04W 72/08
See application file for complete search history.

(56) References Cited

U.S. PATENT DOCUMENTS

| | | | |
|---|---|---|---|
| 2015/0332145 A1* | 11/2015 | Vasseur ................. | H04L 43/062 706/12 |
| 2019/0132741 A1* | 5/2019 | Stone ................... | H04L 63/1483 |
| 2020/0059800 A1* | 2/2020 | Menon .................... | H04L 43/08 |
| 2020/0084087 A1* | 3/2020 | Sharma ................. | H04W 24/04 |

* cited by examiner

*Primary Examiner* — Michael A Keller
(74) *Attorney, Agent, or Firm* — Hauptman Ham, LLP

(57) ABSTRACT

A method includes first determining among a plurality of cells a first set of cells that are anomalous, second determining among remaining cells a second set of cells that are anomalous, and identifying a resulting set of anomalous cells being a combination of the first set and the second set of anomalous cells. The first determining is based on input data of a plurality of first features of each cell among the plurality of cells, and a first machine learning operation. The second determining is based on the input data of the plurality of first features of each cell among the remaining cells, and a second machine learning operation different from the first machine learning operation.

20 Claims, 8 Drawing Sheets

| Date | Cell ID | KPI_1 | KPI_2 | ... | KPI_n | RCA |
|---|---|---|---|---|---|---|
| 1/1/2021 | Cell_ID_1 | | | | | Poor RRC SSR |
| 1/2/2021 | Cell_ID_2 | | | | | Bad DL MCS |
| 1/3/2021 | Cell_ID_3 | | | | | High BLER |
| 1/5/2021 | Cell_ID_4 | | | | | High BLER |
| ⋮ | ⋮ | ⋮ | ⋮ | ⋮ | ⋮ | ⋮ |
| 1/10/2021 | Cell_ID_11 | | | | | High UL noise |
| 1/15/2021 | Cell_ID_12 | | | | | Poor RACH Success Rate |
| 1/31/2021 | Cell_ID_13 | | | | | RACH Failure |

FIG. 7

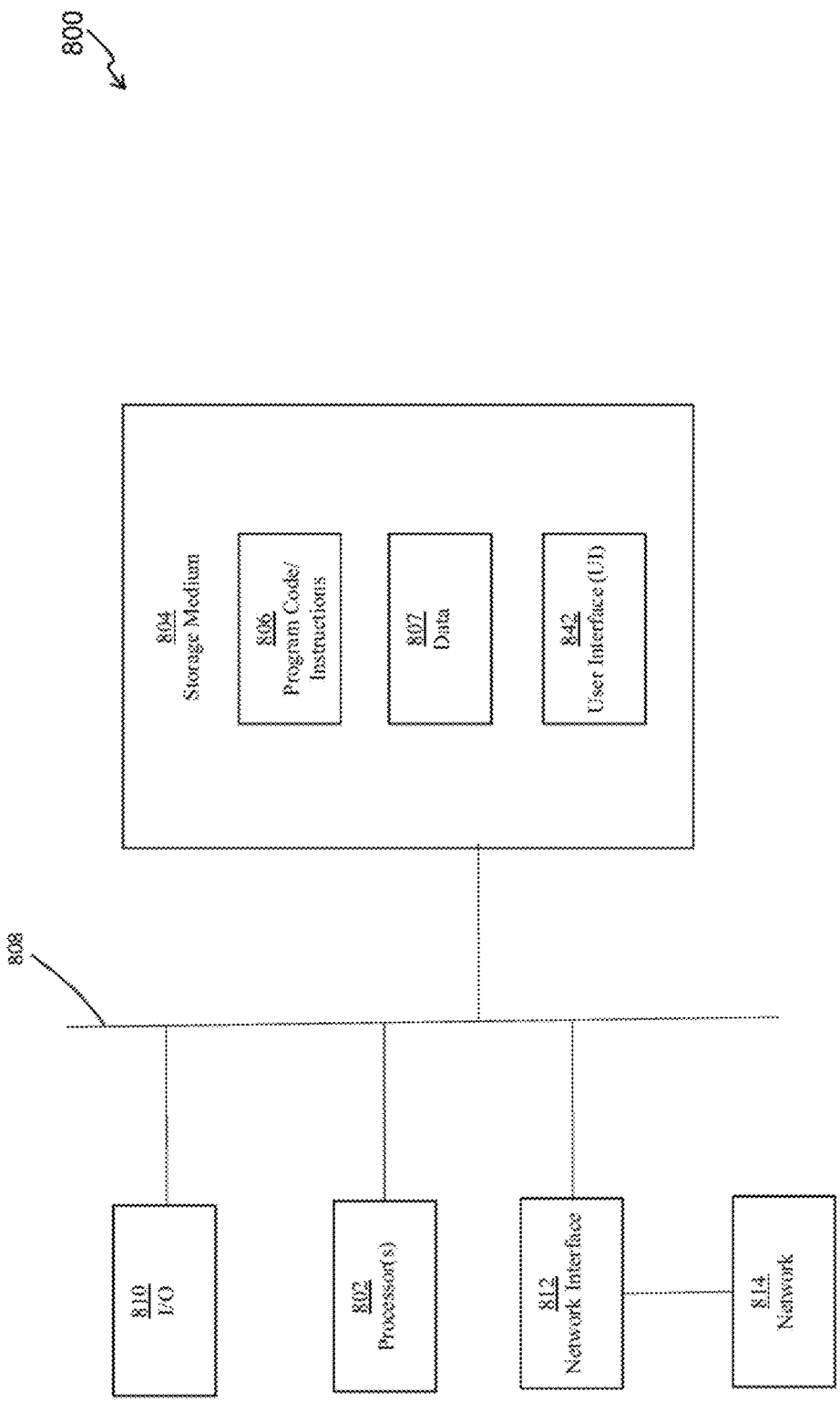

METHOD, DEVICE AND COMPUTER PROGRAM PRODUCT FOR ANOMALY DETECTION

BACKGROUND

Cellular network service providers strive to provide highly reliable, good quality and efficient network connectivity in cellular service through their wireless communications networks (e.g., cellular networks). However, anomalies in a radio access network or in a core network of a wireless communications network result in service failures or degradations in connectivity. Detection of anomalies and understanding the causes, or probable causes, of anomalies are considerations for service providers to prevent or reduce the negative impact of anomalies and/or subsequent outage events.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features be arbitrarily increased or reduced for clarity of discussion.

FIG. 7 is a table showing an example report, in accordance with some embodiments.

FIG. 8 is a schematic block diagram of a computer system, in accordance with some embodiments.

DETAILED DESCRIPTION

Figure 1:
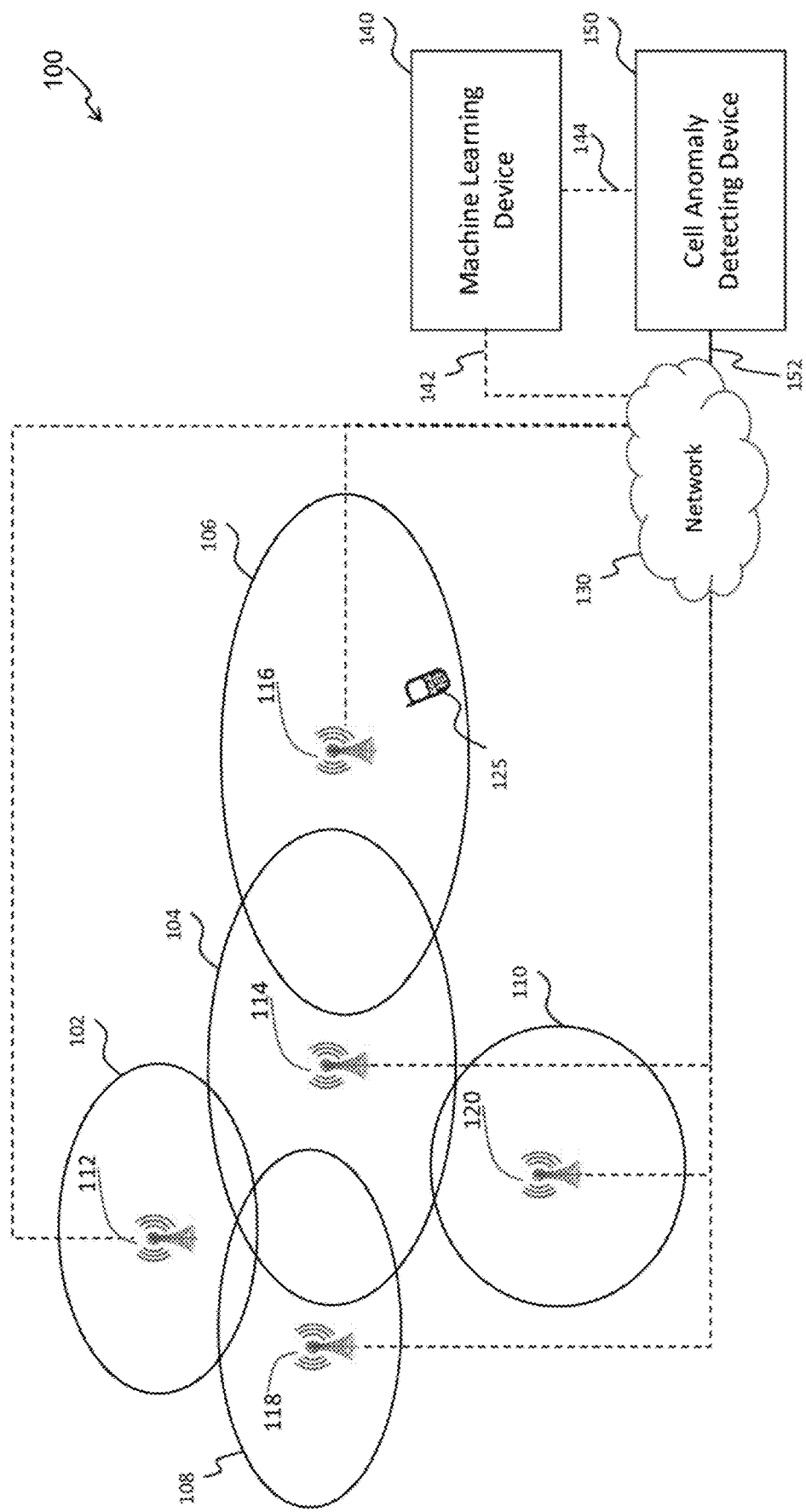
FIG. 1 is a schematic diagram of a cellular network, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors used herein likewise be interpreted accordingly.

Some embodiments provide a Network Anomaly Detection (NAD) framework using machine learning (ML) to detect anomaly events and/or anomalous cells or sites in one or more cellular networks. In at least one embodiment, the utilized machine learning technique comprises an ensemble machine learning technique which combines several different machine learning techniques. In one or more embodiments, the utilized machine learning technique uses multiple key performance indicators (KPIs) in the cellular network to detect downlink (DL) and/or uplink (UL) anomalous cells or sites in the network. In some embodiments, a report of anomalous cells is provided with probable root causes corresponding to the anomalous cells. The probable root causes are usable to optimize and/or improve the network performance. Compared to other approaches where an enormous amount of technical reports and/or data from numerous cells or sites all over the cellular network is reviewed by human operators, the anomaly detection technique in accordance with some embodiments saves time and effort, while helping to ensure effective network management, optimized network performance and/or timely handling of potential network anomalies. In at least one embodiment, it is sufficient to train a machine learning model once from a sufficient amount of data (e.g., daily KPI data over a period of about 30 days), and then the trained machine learning model can be used for anomaly detection without requiring retraining or updates. Other configurations and/or effects are within the scopes of various embodiments.

FIG. 1 is a schematic diagram of a cellular network 100, in accordance with some embodiments.

The cellular network 100 comprises a plurality of cells 102, 104, 106, 108, 110 in which cellular service is provided, through corresponding base stations 112, 114, 116, 118, 120, to a plurality of mobile terminals. A representative mobile terminal 125 is illustrated in FIG. 1 inside the cell 106 serviced by the base station 116. The base stations 112, 114, 116, 118, 120 are coupled to a network 130. In at least one embodiment, the network 130 comprises a core network and the base stations 112, 114, 116, 118, 120 constitute a radio access network of the cellular network 100. The cellular network 100 further comprises a machine learning device 140 and a cell anomaly detecting device 150 also coupled to the network 130. In at least one embodiment, the machine learning device 140 is incorporated in the cell anomaly detecting device 150.

Examples of the cellular network 100 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like.

Example configurations of the base stations 112, 114, 116, 118, 120 include cell towers each having one or more cellular antennas. In an example, a cell tower includes a radio mast, or another raised structure to create or service a corresponding cell in the cellular network 100. The raised structure supports one or more cellular antennas of the base station. The base station further comprises one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Cell towers are also referred to as base transceiver stations, mobile phone masts, or the like. Base station configurations other than cell towers are within the scopes of various embodiments. For example, in one or more embodiments, a base station is a cellular-enabled mobile device that is deployable at an arbitrary geographical location, and that is movable to another arbitrary geographical location as needed. In some embodiments, a cell tower or a cellular-enabled mobile device, where one or more cellular antennas and electronic communications equipment are arranged, is referred to as a cellular site. An example hardware configuration of a base station includes a computer system described with respect to FIG. 8, with the addition of one or more cellular antennas and corresponding cellular transceiving circuitry. In one or more embodiments, the base stations 112, 114, 116, 118, 120 provide cellular communication services to mobile terminals using communication resources. Examples of communication resources include, but are not limited to, a portion of the RF spectrum, time, code, direction (space), or the like, depending, for example, on the communication access technology employed at the base stations 112, 114, 116, 118, 120. Examples of communication access technologies include, but are not limited to, frequency division multiple access (FDMA), time division multiple access (TDMA), code division multiple access (CDMA), orthogonal frequency division multiple access (OFDMA), and spatial division multiple access (SDMA), or the like.

The coverage area of the cellular network 100 in which cellular service is provided through the base stations 112, 114, 116, 118, 120 to mobile terminals is divided into a plurality of geographical areas, i.e., the cells 102, 104, 106, 108, 110. In the example configuration in FIG. 1, the cells 102, 104, 106, 108, 110 correspond to coverage areas, or service areas, of the corresponding base stations 112, 114, 116, 118, 120. Other cell configurations are within the scopes of various embodiments. For example, in one or more embodiments, a cell corresponds to the coverage area, or service area, of a cellular antenna of a base station which may have multiple cellular antennas. In at least one embodiment, a cell corresponds to a combination of the coverage areas, or service areas, of multiple cellular antennas of the same base station or of multiple base stations. In some embodiments, a cell corresponds to a combination of the coverage areas, or service areas, of multiple base stations. In at least one embodiment, the cells 102, 104, 106, 108, 110 have various shapes and/or sizes. In at least one embodiment, a cell among the cells 102, 104, 106, 108, 110 is a macro-cell (covering about 1 Km to 30 Km), a micro-cell (covering about 200 m to 2 Km), or a pico-cell (covering about 4 m to 200 m). In at least one embodiment, a cell among the cells 102, 104, 106, 108, 110 is circular, oval or sector in shape, or may have any shape and/or size depending on directional capabilities of the corresponding cellular antennas. When joined together, the cells 102, 104, 106, 108, 110 provide radio frequency (RF) coverage over a wide geographic area to enable numerous mobile terminals to communicate with each other and with fixed or stationary transceivers and telephones.

Examples of mobile terminals, such as the mobile terminal 125, include, but are not limited to, cell phones, tablets, media players, gaming consoles, personal data assistants (PDAs), laptops, and other electronic devices configured to transmit and/or receive cellular communication to/from the base stations 112, 114, 116, 118, 120 of the cellular network 100. An example hardware configuration of a mobile terminal includes a computer system described with respect to FIG. 8, with the addition of one or more cellular antennas and corresponding cellular transceiving circuitry. Examples of communication technologies for performing cellular communication include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals.

In some embodiments, the network 130 comprises a core network of the cellular network 100. The core network is configured to operate with the base stations 112, 114, 116, 118, 120 to provide mobile terminals in the cellular network 100 with various cellular communication services. Example components of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations 112, 114, 116, 118, 120 by one or more public and/or proprietary networks. An example hardware configuration of a component of the core network includes a computer system described with respect to FIG. 8. In at least one embodiment, the network 130 comprises a section of the Internet.

As a result of technology advancements and proliferation of mobile devices, cellular networks such as the cellular network 100 become more and more complex. In a complex cellular network, automatic anomaly detection is a consideration with an increasing importance for effective operation and management of the cellular network. A reason is that if an anomaly event is not addressed in a timely manner, service deterioration and/or outage may occur with further undesirable consequences.

An anomaly occurs in a cell, or the cell is considered an anomalous cell, when a parameter or a behavior of the cell's operation or performance does not conform to an expected or predetermined normal operation or performance. In some embodiments, an anomalous cell may, but does not necessarily, malfunction or fail. For a cell to be considered anomalous, it is sufficient in one or more embodiments that the cell does not perform or operate as intended, or that the cell performs differently from other, similar cells. A cell's operation, performance or anomaly corresponds to the operation, performance or anomaly of one or more electronic communications equipment that provides a cellular service in the cell. Examples of electronic communications equipment providing cellular services in cells, as described herein, include, but are not limited to, base stations, cellular antennas, transceiving circuitry, components of the core network, or the like.

Due to the increasing complexity of cellular networks, the amount of data or technical reports collected from various cells in cellular networks, even for a short period of time, e.g., one day, becomes enormous and makes it extremely time-consuming, impractical, or even impossible for domain experts or engineers to perform a manual analysis to identify an anomalous cell and/or to identify a root cause of the anomaly. For example, it may take a week or even a month for a domain or network engineer to review data collected from a cell to determine whether the cell is anomalous. To address these and other issues, some embodiments use machine learning to detect anomaly events and/or anomalous cells or sites in one or more cellular networks. In the cellular network 100, the machine learning device 140 and the cell anomaly detecting device 150 are configured to perform the machine learning. The machine learning device 140 corresponds to a learning phase, and the cell anomaly detecting device 150 corresponds to an implementing phase in which a result of machine learning in the learning phase is used to detect anomalous cells. As described herein, in at least one embodiment, the machine learning device 140 is incorporated in the cell anomaly detecting device 150.

The machine learning device 140 is configured to receive training data 142 about the operation or performance of the cells 102, 104, 106, 108, 110 through the network 130. In the example configuration in FIG. 1, the training data 142 are collected from the base stations 112, 114, 116, 118, 120 corresponding to the cells 102, 104, 106, 108, 110. However, other data collection configurations are within the scopes of various embodiments. For example, in at least one embodiment, at least a portion of the training data 142 is collected from at least one component in the core network. The machine learning device 140 is further configured to perform machine learning on the collected training data 142 to train one or more machine learning models 144, and provide the one or more trained machine learning models 144 to the cell anomaly detecting device 150. An example hardware configuration of the machine learning device 140 includes a computer system described with respect to FIG. 8. An example machine learning process performed by the machine learning device 140 is described with respect to FIG. 2.

In some embodiments, the machine learning device 140 comprises one or more neural networks. A neural network, or artificial neural network (ANN), includes one or more computing platforms performing machine learning to solve problems in a manner similar to a biological brain, e.g., a human brain. To do so, the neural network includes a plurality of nodes, or artificial neurons, connected together to simulate neurons in a biological brain. In an example, a node comprises one or more programmable memory cells or controllably variable resistors. Nodes of a neural network are arranged in layers. A signal travels from an input layer through multiple layers of the neural network to an output layer. As the signal travels through the neural network, the signal is modified by weights of the nodes and/or weights of connections among the nodes. The weights are adjusted as learning or training proceeds in the neural network. A trained neural network corresponds to a trained machine learning model, in at least one embodiment.

The cell anomaly detecting device 150 is configured to receive input data 152 for cell anomaly detection. In some embodiments, the input data 152 are collected in the same manner as the training data 142, or a portion of the training data 142, e.g., from the base stations 112, 114, 116, 118, 120, and/or from at least one component in the core network. However, the input data 152 are collected after a training period during which the training data 142 were collected. The cell anomaly detecting device 150 is configured to input the input data 152 into the one or more machine learning models 144 trained by the machine learning device 140, and output a report of anomalous cells based on a decision or prediction by the one or more machine learning models 144. An example hardware configuration of the cell anomaly detecting device 150 includes a computer system described with respect to FIG. 8. Example processes performed by the cell anomaly detecting device 150 are described with respect to FIGS. 3-6. An example of a report output by the cell anomaly detecting device 150 is described with respect to FIG. 7.

Figure 2:
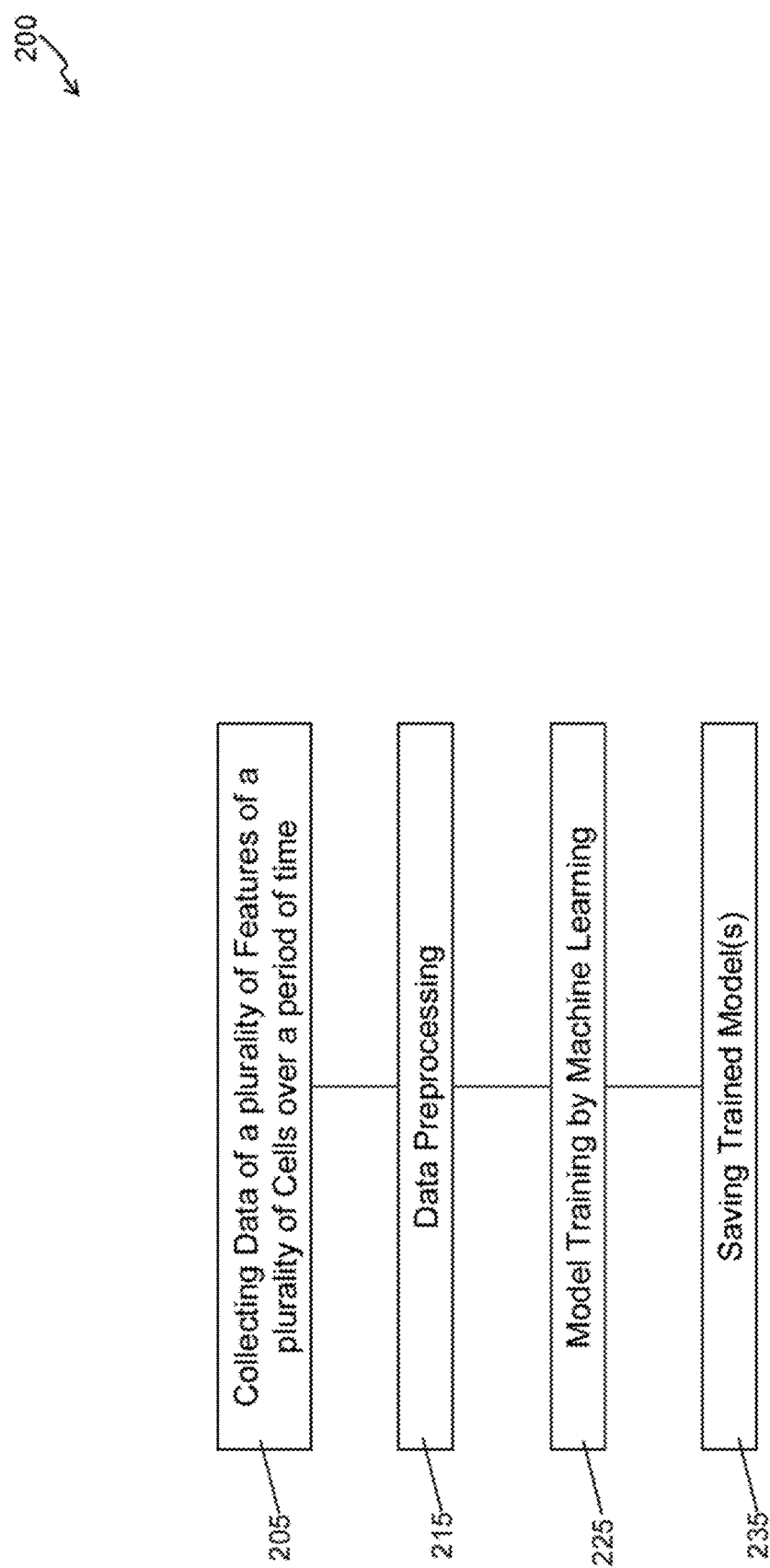
FIGS. 2-6 are flow charts of various methods, in accordance with some embodiments.

FIG. 2 is a flow chart of a method 200, in accordance with some embodiments. In at least one embodiment, the method 200 is a machine learning training process performed by the machine learning device 140 described with respect to FIG. 1.

At operation 205, data of a plurality of features of a plurality of cells are collected over a period of time. In some embodiments, the collected data correspond to the training data 142 described with respect to FIG. 1. The collected data are also referred to as cell level metrics.

Examples of cell features for which data are collected include key performance indicators (KPIs). Other features indicative of the operation or performance of a cell are within the scopes of various embodiments. Example KPIs usable for cell anomaly detection include downlink (DL) KPIs and uplink (UL) KPIs. Other KPIs are usable for cell anomaly detection within the scopes of various embodiments. The DL KPIs are used for detecting cells that show anomalies while performing DL communications, for example, as described with respect to FIGS. 3-4. The UL KPIs are used for detecting cells that show anomalies while performing UL communications, for example, as described with respect to FIGS. 5-6.

In some embodiments, KPI data of various KPIs of a cell are reported from electronic communications equipment providing cellular services in the cell, for example, from various sensors and/or circuitry at a base station corresponding to the cell. Due to a large number of KPIs and a large amount of KPI data associated with the KPIs, not every KPI of a cell is considered in cell anomaly detection, in at least one embodiment. For example, when a group of two or more KPIs are related to each other most of the times, there is a high probability that if one KPI in the group shows that the cell is anomalous, the other KPI(s) in the group will also show that the cell is anomalous. In such situations, it is sufficient to consider one KPI in the group and ignore the other KPI(s) for cell anomaly detection, thereby reducing the amount of processing and time required for cell anomaly detection. In one or more embodiments, a machine learning technique is usable to determine groups of related KPIs. A representative KPI is selected from each group of related KPIs for consideration in cell anomaly detection. As a result, the number of KPIs and the corresponding of KPI data to be considered for cell anomaly detection are significantly reduced, in one or more embodiments.

KPI data are generated and/or reported at various time intervals, e.g., hourly, daily, or the like. In some embodiments, to reduce the amount of KPI data to be processed while ensuring intended accuracy of machine learning and/or cell anomaly detection, daily KPI data are collected in operation 205. Other time intervals, e.g., hourly, or twice a day, for collecting KPI data are within the scopes of various embodiments.

Each set of KPI data collected for a cell in a time interval is referred to as a data point. For example, a set of KPI data collected on day 1 is a first data point, another set of KPI data collected for the same KPIs on day 2 is a second data point, or the like. To achieve intended accuracy for machine learning, a sufficient number of data points is required. However, too many data points increase the amount of processing and time for machine learning without necessarily improving accuracy. In some embodiments, KPI data are collected daily for a period of 30 days (e.g., 30 data points per cell) to provide sufficient accuracy, without unnecessary excessive processing and/or time. Other time periods (or numbers of data points) for data collection, e.g., 15 days, 2 weeks, three weeks, or up to 60 days, are within the scopes of various embodiments. It has been found, in some embodiments, that an amount of daily KPI data collected over a period of 30 days provides a sufficiently large body of data to accurately train a machine learning model with about 98% accuracy. It has been further found, in some embodiments, that the amount of daily KPI data collected over 30 days covers practically all kinds of data ranging from the best performance scenario to the worse performance scenario in a cellular network, and that further prolonging the data collection period might not necessarily significantly increase accuracy.

The number of cells from which KPI data are collected in operation 205 is related to the machine learning accuracy, and to the amount of processing and/or time required for machine learning. In some embodiments, KPI data are collected from several thousand cells, e.g., about ten thousand cells. Other numbers of cells to collected KPI data from are within the scopes of various embodiments.

At operation 215, data pre-processing is performed on the data collected at operation 205. In some embodiments, operation 215 is omitted, i.e., the data collected at operation 205 are used directly for machine learning at a subsequent operation.

In some embodiments, the data pre-processing at operation 215 comprises at least one of deriving one or more additional features for machine learning from a KPI, normalizing KPI data, or the like. Several examples are described herein for the downlink with respect to FIGS. 3-4, and for the uplink with respect to FIGS. 5-6. Other techniques for data pre-processing are within the scopes of various embodiments.

At operation 225, one or more machine learning models are trained by performing supervised machine learning on the training data which include the data collected at operation 205 and pre-processed at operation 215. In some embodiments where operation 215 is omitted, the supervised machine learning is performed directly on the data collected at operation 205 which serve as the training data. An example of supervised machine learning is Logistic Regression (LR). Other supervised machine learning techniques are within the scopes of various embodiments.

In an example of supervised machine learning, a plurality of data points in the training data are known in advance as anomalous or non-anomalous. In other words, the data points in the training data are labeled in advance. In some embodiments, labels such as "anomalous" or "non-anomalous" are assigned to data points collected from one or more cells that are known to be anomalous or non-anomalous, respectively. In at least one embodiment, a domain expert or network engineer reviews a data point and assigns an appropriate label "anomalous" or "non-anomalous" to the data point. Based on the labelled training data, a supervised machine learning technique or algorithm is performed to obtain or train a machine learning model which includes, for example, one or more functions.

In a further example of supervised machine learning, one or more rules based on the KPI data are used to train a machine learning model whether a data point in the training data is anomalous or non-anomalous. Example rules for training a machine learning model are described with respect to FIG. 4.

At operation 235, one or more trained machine learning models obtained by one or more machine learning techniques performed at operation 225 are saved. In at least one embodiment, the one or more trained machine learning models are provided to a cell anomaly detecting device for use in cell anomaly detection, as described with respect to FIG. 1 where one or more machine learning models 144 are provided to the cell anomaly detecting device 150. In some embodiments, each of the machine learning models is trained at operation 225 to return a binary determination of anomaly or non-anomaly in response to a data point of input data, i.e., to identify a cell as anomalous or non-anomalous in response to the input data.

Figure 3:
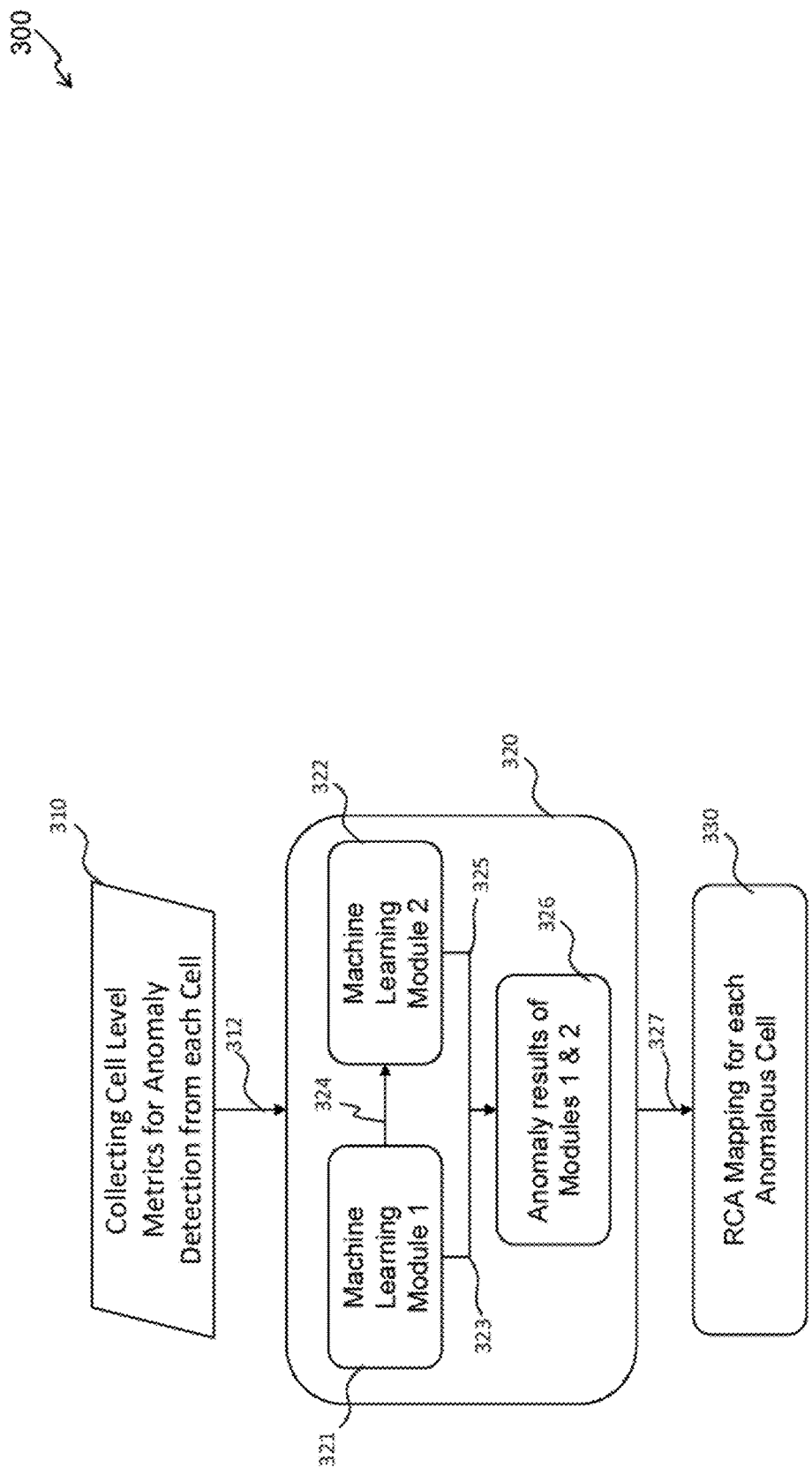

FIG. 3 is a flow chart of a method 300, in accordance with some embodiments. In at least one embodiment, the method 300 is a cell anomaly detection process performed by the cell anomaly detecting device 150 as described with respect to FIG. 1, using one or more machine learning models trained as described with respect to FIGS. 1-2. In at least one embodiment, the method 300 is applicable to detect DL anomalous cells. Other applications of the method 300 for anomaly detection of other types of cells are within the scopes of various embodiments.

At operation 310, cell level metrics for cell anomaly detection are collected from each cell to be determined as anomalous or non-anomalous. In some embodiments, the cell level metrics correspond to input data of a plurality of features of each cell among a plurality of cells subject to cell anomaly detection. In at least one embodiment, the features for which input data are collected are the same as the features for which training data were collected for the machine learning performed to train a machine learning model used later at operation 320 in the method 300. In some embodiments, the input data are subject to the same data pre-processing that was performed on the training data. In at least one embodiment, data pre-processing of the input data is omitted. The collected input data, with or without data pre-processing, are schematically indicated as 312 in FIG. 3.

At operation 320, cell anomaly detection using first and second machine learning modules or operations 321, 322 is performed, based on the input data 312.

In some embodiments, the first machine learning module 321 makes a first determination based on the input data 312 to determine, among the plurality of cells included in the input data 312, a first set 323 of cells that are anomalous. In some embodiments, the first machine learning module 321 performs unsupervised machine learning, e.g., Hierarchical Agglomerative Clustering (HAC) machine learning. The cells determined by the first machine learning module 321 as anomalous cells are collectively output by the first machine learning module 321 as the first set of anomalous cells 323. The cells which are not determined by the first machine learning module 321 as anomalous cells are collectively output by the first machine learning module 321 as a set of remaining cells 324. Although the first machine learning module 321 does not indicate the set of remaining cells 324 as anomalous, there is a possibility that one or more cells in the set of remaining cells 324 may be anomalous. To ensure that anomalous cells in the set of remaining cells 324 are not omitted, the set of remaining cells 324 is subject to further cell anomaly detection using the second machine learning module 322 which is different from the first machine learning module 321. For example, the first and second machine learning modules 321, 322 perform or use different machine learning techniques.

In some embodiments, the second machine learning module 322 makes a second determination based on the input data 312 corresponding to the set of remaining cells 324 to determine, among the set of remaining cells 324, a second set 325 of cells that are anomalous. In some embodiments, the second determination is made by the second machine learning module 322 based on a trained machine learning model previously obtained by supervised machine learning, e.g., LR machine learning. In some embodiments, the trained machine learning model is obtained by the machine learning device 140 and/or the method 200, as described with respect to FIGS. 1-2. In at least one embodiment, the input data 312 of all cells subject to cell anomaly detection are not input into the second machine learning module 322; rather, only the input data 312 corresponding to the set of remaining cells 324 are input into the second machine learning module 322. Further, although the input data 312 of multiple remaining cells 324 are input into the second machine learning module 322, the second machine learning module 322 performs cell anomaly detection for each remaining cell 324 individually. For example, the data point of each remaining cell 324 is input into the second machine learning module 322, and the second machine learning module 322 determines whether the input data point (or remaining cell 324) is anomalous or non-anomalous. The cells determined by the second machine learning module 322 as anomalous cells are collectively output by the second machine learning module 322 as the second set of anomalous cells 325.

The first set of anomalous cells 323 output by the first machine learning module 321 and the second set of anomalous cells 325 output by the second machine learning module 322 are combined at operation 326 to obtain or identify a resulting set 327 of anomalous cells among all cells included in the input data 312. The described combination of two machine learning modules or operations 321, 322 is an example of ensemble machine learning. Other arrangements with more than two machine learning modules or operations being used together for cell anomaly detection are within the scopes of various embodiments.

At operation 330, RCA mapping is performed to indicate an RCA, or a root cause of anomaly, for each anomalous cell in the resulting set of anomalous cells 327, based on the input data 312 of the anomalous cell. Examples of RCA mapping are described with respect to FIG. 4.

Figure 4:
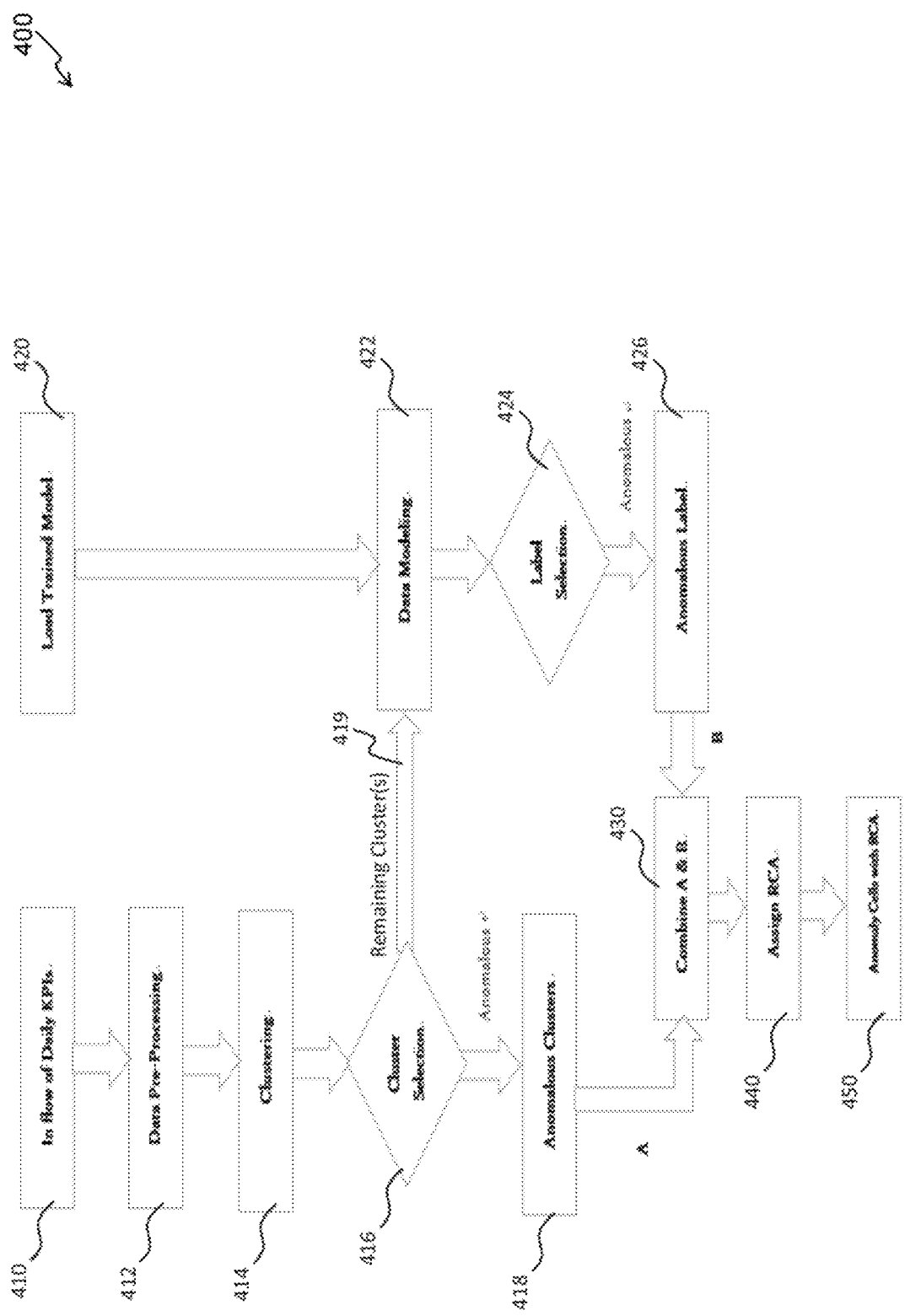

FIG. 4 is a flow chart of a method 400, in accordance with some embodiments. In at least one embodiment, the method 400 is a cell anomaly detection process corresponding to the method 300. In some embodiments, the method 400 is performed by the cell anomaly detecting device 150 as described with respect to FIG. 1, and/or uses one or more machine learning models trained as described with respect to FIGS. 1-2. In at least one embodiment, the method 400 is applicable to detect DL anomalous cells. Other applications of the method 400 for anomaly detection of other types of cells are within the scopes of various embodiments.

At operation 410, input data for cell anomaly detection are collected from a plurality of cells, for example, as described with respect to FIG. 2. In the example configuration in FIG. 4, the input data comprises KPI data, e.g., daily KPI data. In some embodiments, as described with respect to FIG. 2, to reduce the amount of data to be processed for cell anomaly detection, not all KPIs of a cell are considered or collected. For example, for the downlink, a reduced set of DL KPIs is selected from about 60 KPIs for a cell. In some embodiments, the reduced set of DL KPIs considered for cell anomaly detection includes at least one selected from the group consisting of:

Network Availability,
Random Access Channel (RACH) Attempts/Success,
Radio Resource Control (RRC) Setup Success Rate (SSR),
Radio Access Bearer (ERAB) SSR,
ERAB Drop Rate,
DL Physical Resource Block (PRB) Resource Utilization,
DL Modulation and Coding Schemes (MCSs),
Control Channel Element (CCE) Utilization,
UL Traffic,
DL Traffic, and
Timing Advance (TA) Type 1.

In at least one embodiment, the set of DL KPIs considered for cell anomaly detection includes all of the above listed 11 DL KPIs.

At operation 412, data pre-processing is performed for the KPI data collected at operation 410, for example, as described with respect to FIG. 2. In at least one embodiment, the data pre-processing comprises additional feature derivation and/or data normalization. In some embodiments, the data pre-processing at operation 412 is omitted.

In some embodiments, additional features are derived from DL MCS. For example, the KPI DL MCS comprises a total of 29 possible DL MCS indices from 0 to 28. In some embodiments, the total of 29 possible MCS indices from 0 to 28 are split into four non-overlapping ranges, including a first range of MCS indices from 0 to 9, a second range of MCS indices from 10 to 15, a third range of MCS indices from 16 to 22, and a fourth range of MCS indices from 23 to 26, namely:

DL_MCS09: DL MCS 0 to 9
DL_MCS1015: DL MCS 10 to 15
DL_MCS1622: DL MCS 16 to 22
DL_MCS2326: DL MCS 23 to 26

The MCS indices of 27 to 28 are preserved for signaling and are not considered for machine learning and/or cell anomaly detection. As a result, four additional features DL_MCS09, DL_MCS1015, DL_MCS1622, and DL_MCS2326 are derived from the KPI DL MCS. Other arrangements are within the scopes of various embodiments. For example, it is possible that the number of non-overlapping ranges of MCS indices is other than four, and/or the specific MCS indices in each range are different from the described example.

In at least one embodiment, the KPI data corresponding to the derived additional features are further normalized, for example, as follows:

$$DL\_MCS09(\%) = (DL\_MCS09.sum * 100) / DLMCS\_SUM$$

$$DL\_MCS1015(\%) = (DL\_MCS1015.sum * 100) / DLMCS\_SUM$$

$$DL\_MCS1622(\%) = (DL\_MCS1622.sum * 100) / DLMCS\_SUM$$

$$DL\_MCS2326(\%) = (DL\_MCS2326.sum * 100) / DLMCS\_SUM$$

In this example, DL_MCS09(%) is a normalized value (percentage) of DL_MCS09, and is calculated from DL_MCS09.sum, which is the sum of values of DL_MCS at MCS indices 0-9, respectively, and also from DLMCS_SUM, which is the sum of values of DL_MCS at MCS indices 0-26, respectively. The other normalized values DL_MCS1015(%), DL_MCS1622(%), and DL_MCS2326(%) are similarly calculated.

In at least one embodiment, an additional feature RACH SSR (MSG3/MSG1), also referred to as RACH SSR, is derived from the KPI RACH Attempts/Success, and has a value calculated, for example, as follows:

$$RACH\ SSR\ (\%) = (RACH\_Success / RACH\_Attempts) * 100$$

In this example, RACH SSR (%) is a normalized value (percentage) of RACH SSR, and is calculated from RACH_Success, which is the number of RACH successes in the KPI RACH Attempts/Success, and also from RACH_Attempts, which is the number of RACH attempts in the KPI RACH Attempts/Success.

In at least one embodiment, an additional feature TA_Dist., which is the distance between a base station (eNB) and user equipment (UE), is calculated using reported values of TA Type 1/Type 2.

In some embodiments, for the downlink, from the initial 11 DL KPIs listed above, the following 16 features and corresponding KPI data are obtained for machine learning and/or cell anomaly detection:
- Radio Network Availability Rate (%) (or 1013-Radio Network Availability Rate (%)),
- RACH SSR (%) (or RACH SSR (MSG3/MSG1) (%)),
- RRC SSR (%) (or 1005-RRC Setup Success Rate (%)),
- ERAB SSR (%) (or 1006-ERAB Setup Success Rate (%)),
- Maximum User Equipment (UE) Number (or 1002-Max UE Num),
- DL PRB Utilization (or 3150-DL PRB Utilization),
- Residual Block Error Rate (BLER) DL (or 4040-Residual BLER DL),
- DL_MCS09(%),
- DL_MCS1015(%),
- DL_MCS1622(%),
- DL_MCS2326(%),
- CCE Utilization (%) at aggregation level (AGG) 1 (or 3645-CCE Utilization AGG1(%)),
- CCE Utilization (%) at AGG 2 (or 3646-CCE Utilization AGG2(%)),
- CCE Utilization (%) at AGG 4 (or 3647-CCE Utilization AGG4(%)),
- CCE Utilization (%) at AGG 8 (or 3648-CCE Utilization AGG8(%)), and
- TA_Dist.

In some embodiments, operations 410, 412 of the method 400 correspond to operation 310 of the method 300.

At operation 414, clustering is performed on the KPI data of a plurality of cells collected at operation 410 and/or pre-processed at operation 412, to group the plurality of cells into a plurality of clusters. In some embodiments, the clustering corresponds to an operation of unsupervised machine learning. In an example described herein, the unsupervised machine learning comprises HAC machine learning. Other machine learning and/or clustering techniques are within the scopes of various embodiments.

In an HAC clustering or operation, each data point in the KPI data is initially considered as a cluster. Clusters are sequentially merged together based on their degrees of similarity, e.g., based on distances between the clusters. For example, at each iteration, clusters determined to be sufficiently similar are merged together to obtain a larger cluster. Clusters that remain unmerged with the other clusters after a predetermined threshold (e.g., a predetermined number of iterations or a predetermined number of cluster) has been met are considered as outliers, and are determined as anomalous clusters. All cells in such anomalous clusters are determined as anomalous cells.

At operation 416, a cluster selection is performed to identify, among a plurality of clusters obtained by the clustering, one or more anomalous clusters 418. The remaining clusters 419 are not yet determined as anomalous, and are subject to further anomaly detection at operations 422, 424 as described herein. In some embodiments, operations 414, 416 correspond to the first machine learning module or operation 321, the anomalous clusters 418 correspond to the first set of anomalous cells 323, and the remaining clusters 419 correspond to the set of remaining cells 324. The cells included in the one or more anomalous clusters 418 are considered as anomalous cells. In at least one embodiment, each of the anomalous cells is assigned a corresponding flag, e.g., a logic value "1."

At operation 420, a trained machine learning model is loaded. In some embodiments, the machine learning model is previously trained by the machine learning device 140 and/or the method 200 described with respect to FIGS. 1 and 2. In at least one embodiment, the training data used to train the machine learning model include the same features, or KPIs, which are collected and/or pre-processed similarly to operations 410, 412.

In at least one embodiment, a difference between the input data collected for cell anomaly detection and the training data collected for training the machine learning model is that the training data include a larger amount of KPI data. For example, the input data collected for cell anomaly detection may include KPI data collected for one day for each cell. To the contrary, the training data for training the machine learning model may include KPI data collected over a time period of multiple days, e.g., 30 days, for each cell. In some embodiments, the plurality or set of cells from which input data are collected for cell anomaly detection may not be the same as the set of cells from which training data are collected for training the machine learning model. In at least one embodiment, the two sets of cells for cell anomaly detection and machine learning may partially overlap, entirely overlap, or not overlap at all.

In some embodiments, to train the machine learning model to label whether a cell or a data point in the training data is anomalous or not, one or more rules are included in the training process. An example set of rules for training the machine learning model comprises at least one of the following rules:
1. 1005-RRC Setup Success Rate (%)<95,
2. 1006-ERAB Setup Success Rate (%)<95,
3. 4040-Residual BLER DL>20,
4. DL_MCS2326(%)<5,
5. TA_Dist<150, and
6. DL_MCS09(%)>70 and 3648-CCE Utilization AGG8 (%)>60.

In some embodiments, the set of rules for training the machine learning model includes all of the above-listed Rules 1-6. When a data point in the training data satisfies at least twos of Rules 1-6, the cell corresponding to the data point is given a label "anomalous." Otherwise, the cell is given a label "non-anomalous." The described number of rules, the described specific features included in the rules, and/or the thresholds (e.g., "95" of Rule 1, "20" of Rule 3) are examples. Other rules are within the scopes of various embodiments. The training data and the corresponding labels "anomalous" and "non-anomalous" are used in accordance with a supervised machine learning technique, e.g., LR machine learning, to train the machine learning model. As described herein, in one or more embodiments, the machine learning model is trained once and then used for cell anomaly detection without a need for update and/or retraining. Other arrangements are within the scopes of various embodiments.

At operation 422, data modeling is performed by entering the input data corresponding to the cells of the remaining clusters 419 into the trained machine learning model loaded at operation 420. In some embodiments, although the input data of multiple cells of the remaining clusters 419 are entered into the trained machine learning model, the trained machine learning model processes each cell individually to determine whether the cell is anomalous or not, i.e., by assigning one of the labels "anomalous" or "non-anomalous" to each cell based on the KPI data of the cell.

At operation 424, a label selection is performed. For example, among cells of the remaining clusters 419, the cells given the label "anomalous" by the trained machine learning model are each assigned a corresponding flag, e.g., a logic value "1," and the cells given the label "non-anomalous" by the trained machine learning model are each assigned a corresponding flag, e.g., a logic value "0." As a result, anomalous cells 426 are outputted. In some embodiments, operations 420, 422, 424, 426 correspond to the second machine learning model or operation 322, and the anomalous cells 426 correspond to the second set of anomalous cells 325.

At operation 430, the anomalous cells in the anomalous clusters 418 determined by unsupervised machine learning are combined with the anomalous cells 426 determined by supervised machine learning, to obtain a resulting set of anomalous cells. In some embodiments, operation 430 corresponds to operation 326 of the method 300.

At operation 440, an RCA is indicated for each anomalous cell in the resulting set of anomalous cells, based on the input data of the anomalous cell. In some embodiments, operation 440 corresponds to operation 330 of the method 300. In some embodiments, an example set of rules for DL RCA assignment comprises at least one of the following rules:

7. when 1013-Radio Network Availability Rate (%)==0, RCA is Zero Availability,
8. when 4040-Residual BLER DL>20, RCA is High BLER,
9. when DL_MCS09(%)>70, RCA is Bad DL_MCS,
10. when 1005-RRC Setup Success Rate (%)<95, RCA is Poor RRC SSR,
11. when 3648-CCE Utilization AGG8(%)>60, RCA is High CCE Utilization, and
12. when none of Rules 7-11 are met, it is a False Positive, i.e., the cell in question is not a DL anomalous cell.

In some embodiments, the set of rules for DL RCA assignment includes all of the above-listed Rules 7-12. The described number of rules, the described specific features included in the rules, and/or the thresholds (e.g., "20" of Rule 8, "95" of Rule 10) are examples. Other rules are within the scopes of various embodiments.

At operation 450, a report of anomalous cells with the corresponding assigned RCAs is output. An example report is described with respect to FIG. 7. The report of anomalous cells indicates to domain experts or network engineers the cells or sites where anomalies occur, and the assigned RCAs indicate a nature or cause of the corresponding anomalies. As a result, in at least one embodiment, it is possible for domain experts or network engineers to quickly and/or easily realize where/what a problem or issue that caused an anomaly may be, and to timely take corrective actions to achieve one or more objectives. For example, the radio network performance can be optimized in order to provide better quality of service to the users and their UEs, and/or to achieve better utilization of network resources, and/or to plane for future network expansion. For another example, unacceptable performance related issues can be detected and rapid corrective actions may be taken in order to preserve the quality of the cellular network services. Other advantages are within the scopes of various embodiments.

Figure 5:
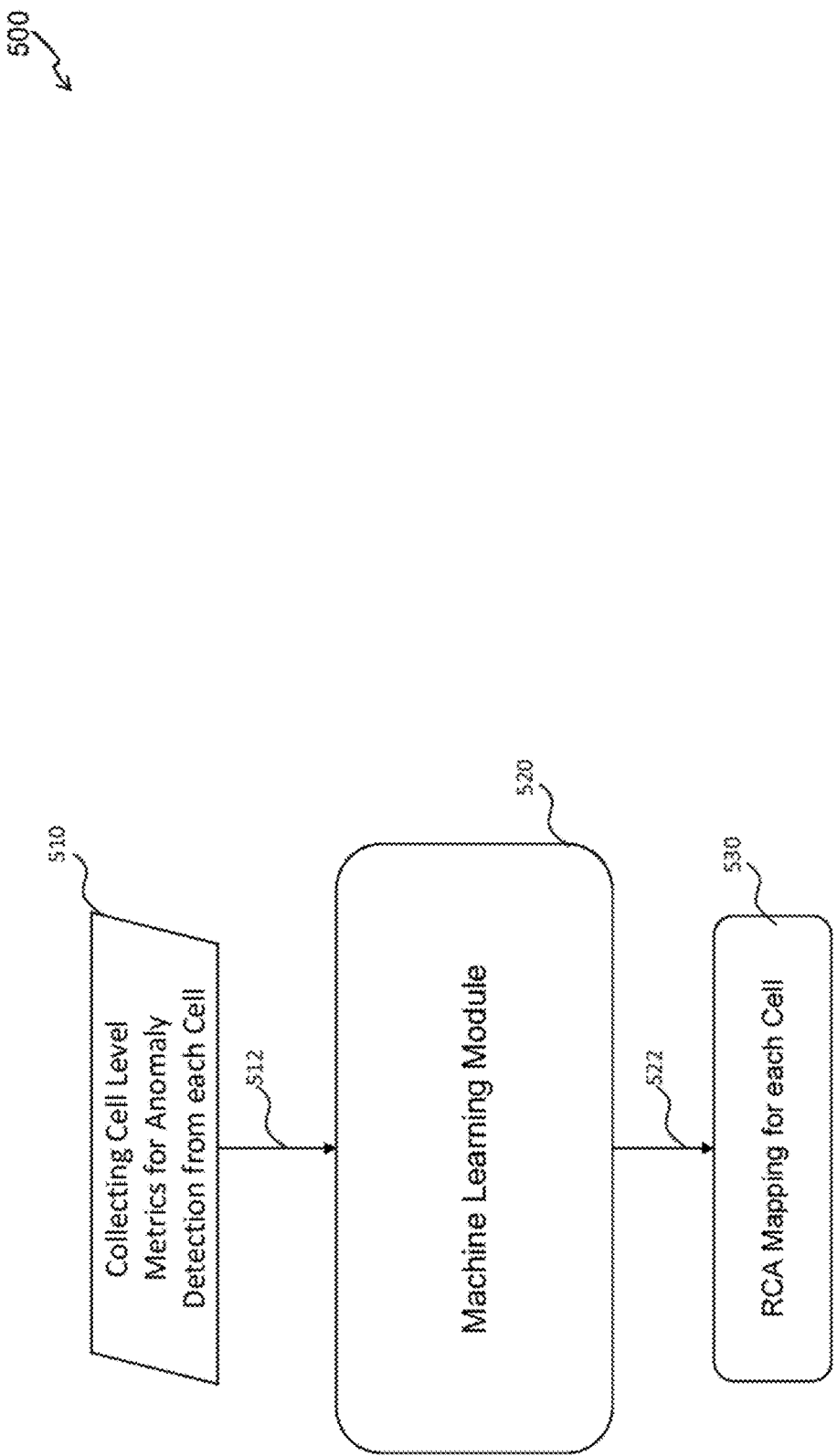

FIG. 5 is a flow chart of a method 500, in accordance with some embodiments. In at least one embodiment, the method 500 is a cell anomaly detection process performed by the cell anomaly detecting device 150 as described with respect to FIG. 1. In at least one embodiment, the method 500 is applicable to detect UL anomalous cells. Other applications of the method 500 for anomaly detection of other types of cells are within the scopes of various embodiments.

At operation 510, cell level metrics for cell anomaly detection are collected from each cell to be determined as anomalous or non-anomalous. In some embodiments, operation 510 is performed in a manner similar to operation 310, and a detailed description of operation 510 is omitted herein. Input data 512 is output as a result of operation 510.

At operation 520, cell anomaly detection using a machine learning module or operation (also designated by "520") is performed, based on the input data 512. In some embodiments, the machine learning module 520 performs unsupervised machine learning, e.g., Gaussian Mixture Model (GMM) machine learning. The cells determined by the machine learning module 520 as anomalous cells are collectively output by the machine learning module 520 as a set of anomalous cells 522.

At operation 530, RCA mapping is performed to indicate an RCA, or a root cause of anomaly, for each anomalous cell in the set of anomalous cells 522, based on the input data 512 of the anomalous cell. Examples of RCA mapping are described with respect to FIG. 6.

Figure 6:
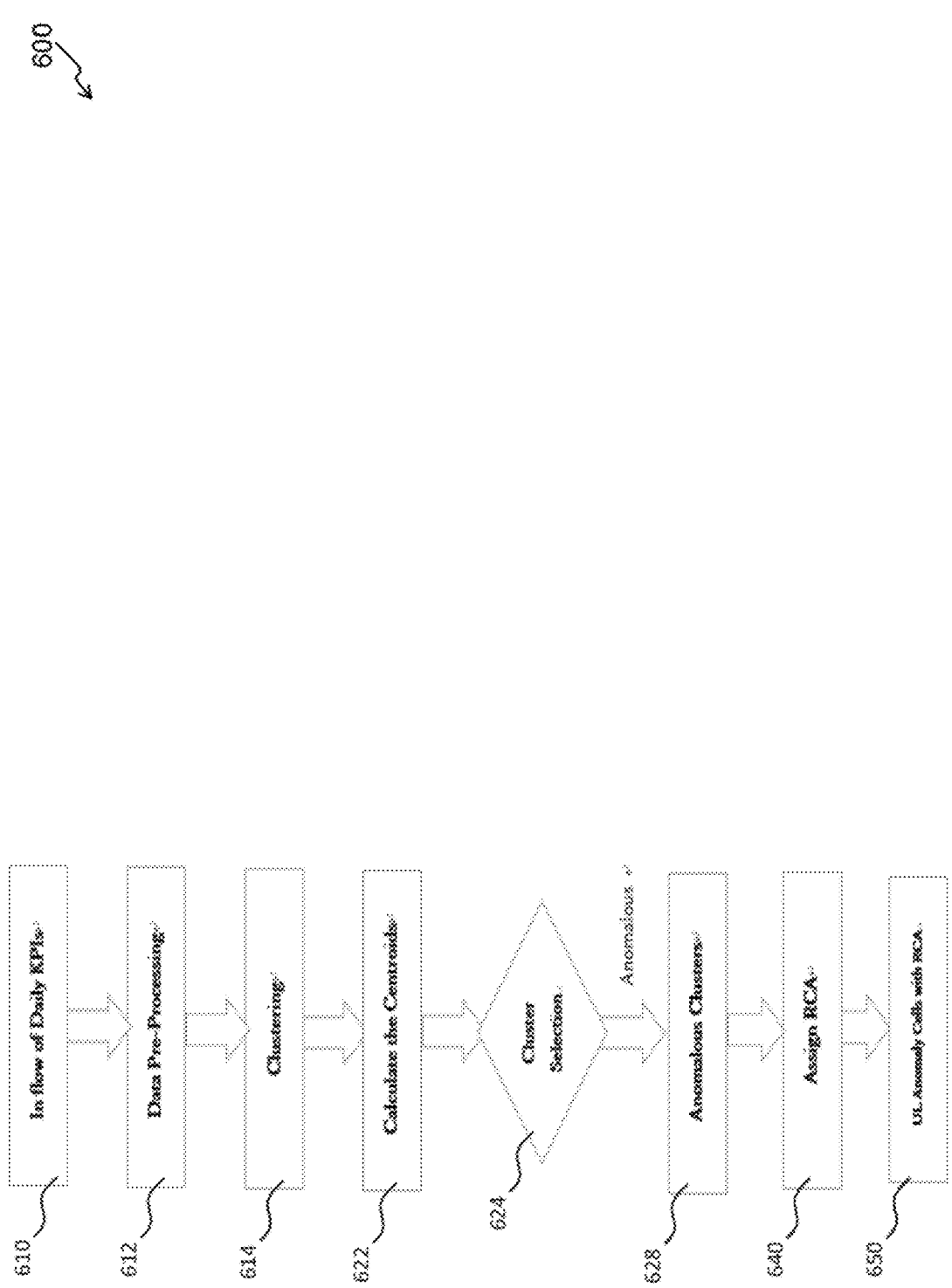

FIG. 6 is a flow chart of a method 600, in accordance with some embodiments. In at least one embodiment, the method 600 is a cell anomaly detection process corresponding to the method 500. In some embodiments, the method 600 is performed by the cell anomaly detecting device 150 as described with respect to FIG. 1. In at least one embodiment, the method 600 is applicable to detect UL anomalous cells. Other applications of the method 600 for anomaly detection of other types of cells are within the scopes of various embodiments.

At operation 610, input data for cell anomaly detection are collected from a plurality of cells, for example, as described with respect to FIG. 2 and/or FIG. 4. In the example configuration in FIG. 6, the input data comprises KPI data, e.g., daily KPI data. In some embodiments, as described with respect to FIG. 2, to reduce the amount of data to be processed for cell anomaly detection, not all KPIs of a cell are considered or collected. For example, for the uplink, a reduced set of UL KPIs is selected from about 60 KPIs for a cell. In some embodiments, the reduced set of UL KPIs considered for cell anomaly detection includes at least one selected from the group consisting of:

Network Availability,
RACH Attempts/Success,
RRC Setup Success Rate (SSR),
ERAB SSR,
ERAB Success Rate,
Quality of Service (QoS) Class Identifier (QCI) 9 and 5,
RRC Average Connected,
UL Noise, and
UL MCSs.

In at least one embodiment, the set of UL KPIs considered for cell anomaly detection includes all of the above listed 9 UL KPIs.

At operation 612, data pre-processing is performed for the KPI data collected at operation 610, for example, as described with respect to FIG. 2 and/or FIG. 4. In at least one embodiment, the data pre-processing comprises additional feature derivation and/or data normalization. In some embodiments, the data pre-processing at operation 612 is omitted.

In some embodiments, additional features are derived from UL MCS. For example, the KPI UL MCS comprises a total of 29 possible UL MCS indices from 0 to 28. In some embodiments, the total of 29 possible MCS indices from 0 to 28 are split into four non-overlapping ranges, including a first range of MCS indices from 0 to 9, a second range of MCS indices from 10 to 15, a third range of MCS indices from 16 to 22, and a fourth range of MCS indices from 23 to 26, namely:

UL_MCS09: UL MCS 0 to 9
UL_MCS1015: UL MCS 10 to 15
UL_MCS1622: UL MCS 16 to 22
UL_MCS2326: UL MCS 23 to 26

The MCS indices of 27 to 28 are preserved for signaling and are not considered for machine learning and/or cell anomaly detection. As a result, four additional features UL_MCS09, UL_MCS1015, UL_MCS1622, and UL_MCS2326 are derived from the KPI UL MCS. Other arrangements are within the scopes of various embodiments. For example, it is possible that the number of non-overlapping ranges of MCS indices is other than four, and/or the specific MCS indices in each range are different from the described example.

In at least one embodiment, the KPI data corresponding to the derived additional features are further normalized, for example, as follows:

UL_MCS09(%)=(UL_MCS09.sum*100)/
    ULMCS_SUM

UL_MCS1015(%)=(UL_MCS1015.sum*100)/UL-
    MCS_SUM

UL_MCS1622(%)=(UL_MCS1622.sum*100)/UL-
    MCS_SUM

UL_MCS2326(%)=(UL_MCS2326.sum*100)/UL-
    MCS_SUM

In this example, UL_MCS09(%) is a normalized value (percentage) of UL_MCS09, and is calculated from UL_MCS09.sum, which is the sum of values of UL_MCS at MCS indices 0-9, respectively, and also from DLMCS_SUM, which is the sum of values of UL_MCS at MCS indices 0-26, respectively. The other normalized values UL_MCS1015(%), UL_MCS1622(%), and UL_MCS2326(%) are similarly calculated.

In at least one embodiment, an additional feature RACH SSR (MSG3/MSG1), also referred to as RACH SSR, is derived from the KPI RACH Attempts/Success, as described with respect to FIG. 4.

In some embodiments, for the uplink, from the initial 9 UL KPIs listed above, the following 15 features and corresponding KPI data are obtained for machine learning and/or cell anomaly detection:

Radio Network Availability Rate (%) (or 1013-Radio Network Availability Rate (%)),
RACH SSR (%) (or RACH SSR (MSG3/MSG1) (%)),
RRC SSR (%) (or 1005-RRC Setup Success Rate (%)),
ERAB SSR (%) (or 1006-ERAB Setup Success Rate (%)),
ERAB SSR at QCI 5 (or 3079-ErabSetupSuccess Rate.QCI5),
ERAB SSR at QCI 9 (or 3080-ErabSetupSuccess Rate.QCI9),
Maximum User Equipment (UE) Number (or 1002-Max UE Num),
UL PRB Utilization (or 3151-UL PRB Utilization),
Residual Block Error Rate (BLER) UL (or 4044-Residual BLER UL),
UL_MCS09(%),
UL_MCS1015(%),
UL_MCS1622(%),
UL_MCS2326(%),
DL_MCS2326(%), and
FD UL Average Noise (or 1181-FDUL.AvgNoise).

It should be noted that, in these specific examples, there are several features which are used for both DL and UL cell anomaly detection. In some embodiments, operations 610, 612 of the method 600 correspond to operation 510 of the method 500.

In at least one embodiment, training data used to train a machine learning module, e.g., the machine learning module 520, to be used in the method 600 include the same features, or KPIs, which are collected and/or pre-processed similarly to operations 610, 612. In at least one embodiment, a difference between the input data collected for cell anomaly detection and the training data collected for machine learning training is that the training data include a larger amount of KPI data. For example, the input data collected for cell anomaly detection may include KPI data collected for one day for each cell. To the contrary, the training data for machine learning training may include KPI data collected over a time period of multiple days, e.g., 30 days, for each cell. In some embodiments, the plurality or set of cells from which input data are collected for cell anomaly detection may not be the same as the set of cells from which training data are collected for machine learning training. In at least one embodiment, the two sets of cells for cell anomaly detection and machine learning may partially overlap, entirely overlap, or not overlap at all.

At operation 614, clustering is performed on the KPI data of a plurality of cells collected at operation 610 and/or pre-processed at operation 612, to group the plurality of cells into a plurality of clusters. In some embodiments, the clustering corresponds to an operation of unsupervised machine learning. In an example described herein, the unsupervised machine learning comprises GMM machine learning. Other machine learning and/or clustering techniques are within the scopes of various embodiments.

In a machine learning training phase, the training data are collected and/or pre-processed as described with respect to operations 610, 612, and are clustered at operation 614 to obtain a plurality of clusters. Data points that do not belong to any of the plurality of clusters are considered as anomalies. In some embodiments, if a cluster has a size (or a number of data points) at or below a predetermined threshold, all data points in the cluster are considered as anomalies.

In a cell anomaly detection phase, the input data are collected and/or pre-processed as described with respect to operations 610, 612, and are clustered at operation 614 to obtain a plurality of clusters.

At operation 622, centroids of the plurality of clusters of data points in the input data are calculated. In some embodiments, one or more further parameters indicating a size and/or a shape of each cluster are also calculated.

At operation 624, a cluster selection is performed to identify, among the plurality of clusters obtained by the clustering of the input data at operation 614, one or more anomalous clusters 628. Each cluster is considered individually. In some embodiments, to determine whether a cluster is anomalous or not, one or more rules are applied to the KPI values of the centroid of the cluster as calculated at operation 622. An example set of rules for determining whether a cluster is anomalous or not comprises at least one of the following rules:

13. 1006-ERAB Setup Success Rate (%)<90,
14. RACH SSR (MSG3/MSG1) (%)<25, and
15. 1181-FDUL.AvgNoise>-105.

In the above-listed Rules 13-15, the KPI values of ERAB SSR, RACH SSR, and FDUL.AvgNoise are KPI values of the centroid of the cluster under consideration. In some embodiments, the set of rules for determining whether a cluster is anomalous or not includes all of the above-listed Rules 13-15. When a cluster (e.g., its centroid) satisfies at least twos of Rules 13-15, the cluster is given a label "anomalous." Otherwise, the cluster is given a label "non-anomalous." The described number of rules, the described specific features included in the rules, and/or the thresholds (e.g., "90" of Rule 13, "-105" of Rule 15) are examples. Other rules are within the scopes of various embodiments.

In some embodiments, instead of using KPI values of the centroid of a cluster, it is possible to use other KPI values calculated from the data points of the cluster, to determine whether the cluster is anomalous or not. For example, mean or average KPI values of the data points of the cluster are usable in the above-listed Rules 13-15 to determine whether the cluster is anomalous or not. Other configurations are within the scopes of various embodiments.

In some embodiments, operations 614, 622, 624 correspond to the machine learning module or operation 520, and the one or more anomalous clusters 628 correspond to the set of anomalous cells 522. The cells included in the one or more anomalous clusters 628 are considered as anomalous cells. In at least one embodiment, each of the anomalous cells is assigned a corresponding flag, e.g., a logic value "1."

At operation 640, an RCA is indicated for each anomalous cell in the one or more anomalous clusters 628, based on the input data of the anomalous cell. In some embodiments, operation 640 corresponds to operation 530 of the method 500. In some embodiments, an example set of rules for UL RCA assignment comprises at least one of the following rules:

16. when 1013-Radio Network Availability Rate (%)==0, RCA is Zero Availability,
17. when RACH SSR (MSG3/MSG1) (%)==0, RCA is RACH Failure,
18. when 1005-RRC Setup Success Rate (%)==0, RCA is RRC Setup Failure,
19. when 1006-ERAB Setup Success Rate (%)==0, RCA is ERAB Failure,
20. when 1181-FDUL.AvgNoise>-105, RCA is High UL Noise,
21. when 4044-Residual BLER UL>20, RCE is High UL BLER,
22. when RACH SSR (MSG3/MSG1) (%)<25, RCA is Poor RACH Success Rate, and
23. when none of Rules 16-22 are met, it is a False Positive, i.e., the cell in question is not an UL anomalous cell.

In some embodiments, the set of rules for UL RCA assignment includes all of the above-listed Rules 16-23. The described number of rules, the described specific features included in the rules, and/or the thresholds (e.g., "20" of Rule 21, "25" of Rule 22) are examples. Other rules are within the scopes of various embodiments.

At operation 650, a report of anomalous cells with the corresponding assigned RCAs is output. An example output list is described with respect to FIG. 7. In some embodiments, the cell anomaly detecting device 150 is configured to perform both the method 400 for detecting DL anomalous cells and the method 600 for detecting UL anomalous cells.

FIG. 7 is a table showing an example report 700 of anomalous cells with corresponding assigned RCAs, in accordance with some embodiments. In the example configuration in FIG. 7, the report 700 includes both a report of DL anomalous cells output by the method 400 and a report of UL anomalous cells output by the method 600. In some embodiments, a report of DL anomalous cells is separate from a report of UL anomalous cells.

The report 700 is in the form of a table comprising a plurality of columns 702, 704, 706, 708. Each row of the table corresponds to a data point, e.g., daily KPI data of a cell. The column 702 indicates a date when KPI data of each cell are collected. The column 704 indicates a cell identification (ID) of each cell. The columns 706 include data or values of various features $KPI\_1$~$KPI\_n$ considered in UL and/or DL cell anomaly detection as described herein. In some embodiments, the features $KPI\_1$~$KPI\_n$ include features derived from the daily KPI data, as described with respect to operations 412, 612. The column 708 includes an RCA determined for each cell. For example, a row 712 indicates that the cell having Cell_ID_1 is assigned the RCA "Poor RRC SSR" meaning that the cell is a DL anomalous cell that met Rule 10 (1005-RRC Setup Success Rate (%)<95). For another example, a row 722 indicates that the cell having Cell_ID_11 is assigned the RCA "High UL noise" meaning that the cell is an UL anomalous cell that met Rule 20 (1181-FDUL.AvgNoise>-105). The report 700 gives the domain expert or network engineer in charge an easy way to visualize the cells where anomalies are observed, and the probable causes (i.e., RCAs) for such anomalies. As a result, the domain expert or network engineer in charge can timely take corrective action as necessary.

Some embodiments as described herein provide a time and computation-efficient way to process a large amount of data, e.g., KPI data, coming from a large number of cells, e.g., a few thousand cells in some situations, and also provide an easy-to-understand report of anomalous cells and their RCAs, e.g., the report 700, with sufficient accuracy while saving time and labor for reviewing the large amount of KPI data. For example, daily KPI data including data that may not be required for cell anomaly detection are collected from a plurality of cells. The cell anomaly detecting device 150 is configured to perform data pre-processing to retain those KPIs required for cell anomaly detection, and to derive additional features from one or more of the retained KPIs. One or more machine learning techniques are applied by the cell anomaly detecting device 150 to identify anomalous clusters of cells, thereby quickly determining multiple anomalous cells at once. Accuracy is ensured by serially applying multiple machine learning techniques, and/or by machine learning training based on a training data set of sufficient size. Each of the anomalous cells is then individually assigned a corresponding RCA based on the corresponding KPI data, and an easy-to-understand report is output to assist the domain expert or network engineer in charge to make timely decisions in one or more of performance optimization, outage prevention, trouble shooting, network planning, or the like. In at least one embodiment, the ability to simply receive daily KPI data from several thousand cells and quickly and efficiently generate a concise report of a much lower number (e.g., a few dozen or hundred) of anomalous cells and their RCAs is a significant advantage.

In the area of telecommunications, there are multiple key performance indicators (KPIs) that are required to monitor and/or to identify the quality (performance) of the cells/sites. Each hour the generated data for these KPIs are huge, which makes the manual analysis almost impossible to perform. Further, it is desirable to identify the root cause of the anomaly. An anomalous behavior, if not addressed timely, could indicate a possible failure that can lead to network degradation, huge maintenance cost, and bad user experience.

Some embodiments provide a Network Anomaly Detection (NAD) framework using ensemble machine learning utilizing the telecommunications network KPIs which is useful to detect downlink (DL) and/or uplink (UL) anomalous cells or sites in the networks with probable root causes, which will be used to optimize/improve the network performance.

In some embodiments, it is possible to detect anomalous behaviors of telecommunications cells using machine learning with respect to downlink and/or uplink, and to assign the possible root causes automatically and quickly, to help domain experts when performing a drill down analysis of the degraded cells/sites and their KPIs. The data used in the NAD framework contain information about the downlink and uplink of the telecommunications cells/sites' behaviors through time. The data gathered for multiple DL and UL KPIs from different data sources to perform the NAD framework (algorithms) are collected per day and per cell.

In some embodiments, the NAD framework (algorithms) is applicable for the purpose of detecting anomalies in the data describing the downlink and uplink components (properties) of the telecommunications cells, by using machine learning to detect anomalies. In at least one embodiment, the NAD framework is divided into two parts, i.e., downlink anomaly detection and uplink anomaly detection. Various machine learning techniques are applicable, including, but not limited to, Hierarchical Agglomerative Clustering (HAC-unsupervised machine learning) and Logistic Regression (LR-supervised machine learning) for DL anomaly detection, and Gaussian Mixture Model (GMM-unsupervised machine learning) clustering technique for UL anomaly detection, in order to identify the anomalous behaviors of telecommunications cells. In at least one embodiment of the NAD framework, machine learning is successfully applied in telecommunications networks to identify the anomalous cells, and machine learning also significantly reduces the time needed for domain experts to identify the anomalous cells in the network.

The detection of anomalous cells in a network is an objective in some embodiments. In one or more embodiments, in addition to cell anomaly detection, it is advantageous to also identify the root cause of the anomaly and, in turn, to provide an actionable insight, ultimately enabling automation of that action or knowledge and means of quick execution to the responsible actors.

The network KPIs are used to analyze the behavior or performance of the network. However, observing KPIs one by one is time consuming and, sometimes, it is difficult to obtain the actual reason for an anomaly. In some embodiments, KPIs and machine learning are used together to detect the anomalous cells in the network in an intelligent way. In at least one embodiment, it is possible to reduce time consumption and/or to perform an automatic analysis to assign provable RCAs to anomalous cells.

In some embodiments, the NAD framework is divided into two parts, i.e., downlink anomaly detection and uplink anomaly detection.

In some embodiments, for DL anomaly detection algorithms, a first level of Hierarchical Agglomerative Clustering (unsupervised learning) and a second level of Logistic Regression model (supervised learning) are used to detect the downlink anomaly cells in the network. For UL anomaly detection algorithms, the Gaussian Mixture Model (GMM) clustering technique is used to detect uplink anomaly cells in the network.

In some embodiments, KPIs of a cell are divided into two groups. The DL KPIs group is used in DL anomaly detection algorithms, with a major focus on network performance with respect to downlink. An example DL KPIs group is described with respect to FIG. 4. The UL KPIs group is used in UL anomaly detection algorithms, with a major focus on network performance with respect to uplink. An example UL KPIs group is described with respect to FIG. 6.

In at least one embodiment, the DL anomaly detection algorithms comprise an ensemble machine learning module, e.g., as described with respect to FIGS. 3, 4. The ensemble machine learning module is configured and/or trained to understand the normal and abnormal behavior based on historical data with per day granularity at cell levels, and to assign flags (or labels) "anomalous" or "non-anomalous" for all cells.

In at least one embodiment, the UL anomaly detection algorithms comprise a machine learning module, e.g., as described with respect to FIGS. 5, 6. The machine learning module is configured and/or trained to understand the normal and abnormal behavior based on raw data with per day granularity at cell levels, and to assign flags (or labels) "anomalous" or "non-anomalous" for all cells.

In some embodiments, using machine learning for process automation and efficient achievement is a useful strategy with real-world application and remarkable advantages. At least one embodiment shows outstanding performances in solving problems containing huge amount of data. For this purpose, some embodiments use ensemble machine learning (HAC and LR) for DL anomaly detection and GMM for UL anomaly detection, as a tool for automated anomaly detection for LTE Network cells/sites. In one or more embodiments, threshold values are used to automatically assign a probable RCA for each cell. The data used for the analysis contain UL and DL KPIs describing the behavior of the cells/sites with per day granularity to reduce the complexity and hourly fluctuations. In some embodiments, an advantage is achieved in automated identification of KPIs that exhibit anomalies among a large number of collected KPIs, which was very time-consuming for domain experts when performing a manual analysis. Some embodiments provide the NAD (for DL and/or UL) algorithms to simplify the tasks of network planning and optimization.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure. In some embodiments, one or more of the described methods are automatically performed, either entirely or at least partly.

FIG. 8 is a schematic block diagram of a computer system 800 in accordance with some embodiments. In one or more embodiments, the computer system 800 is an example configuration of the machine learning device 140 and/or the cell anomaly detecting device 150 as described herein.

The computer system 800 includes a hardware processor 802 and a non-transitory, computer-readable storage medium 804. Storage medium 804, amongst other things, is encoded with, i.e., stores, computer program code 806, i.e., a set of executable instructions, such as one or more algorithms and/or machine learning models used in one or more methods described with respect to one or more of FIGS. 2-6. Execution of instructions 806 by hardware processor 802 implements a portion or all of the methods described herein in accordance with one or more embodiments (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is electrically connected to processor 802 via bus 808. Network interface 812 is connected to a network 814, so that processor 802 and computer-readable storage medium 804 are connectable to external elements or devices via network 814. Processor 802 is configured to execute computer program code 806 encoded in computer-readable storage medium 804 in order to cause computer system 800 to be usable for performing a portion or all of the noted processes and/or methods. In one or more embodiments, processor 802 comprises a central processing unit (CPU), a multi-processor, a distributed processing system, an application specific integrated circuit (ASIC), and/or a suitable processing unit.

In one or more embodiments, computer-readable storage medium 804 comprises an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause computer system 800 to be usable for performing a portion or all of the noted processes and/or methods. In one or more embodiments, storage medium 804 also stores information or data 807, such as training data and/or data for cell anomaly detection used in a portion or all of the noted processes and/or methods.

I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802. Computer system 800 is configured to receive information through I/O interface 810. The information received through I/O interface 810 includes one or more of instructions, data, machine learning models, and/or other parameters for processing by processor 802. The information is transferred to processor 802 via bus 808. Computer system 800 is configured to receive information related to a user interface through I/O interface 810. The information is stored in computer-readable storage medium 804 as user interface (UI) 842.

Network interface 812 allows computer system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more computer system 800.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In some embodiments, a method performed by at least one processor comprises first determining among a plurality of cells a first set of cells that are anomalous, second determining among remaining cells of the plurality of cells that are not determined as anomalous by said first determining a second set of cells that are anomalous, and identifying a resulting set of anomalous cells among the plurality of cells. The first determining is based on input data of a plurality of first features of each cell among the plurality of cells, and a first machine learning operation. The second determining is based on the input data of the plurality of first features of each cell among the remaining cells, and a second machine learning operation different from the first machine learning operation. The resulting set of anomalous cells is a combination of the first set and the second set of anomalous cells.

In some embodiments, a cell anomaly detecting device comprises at least one processor configured to cluster a plurality of cells into a plurality of clusters based on input data of a plurality of downlink (DL) key performance indicators (KPIs) of the plurality of cells, perform cluster selection to identify one or more first anomalous clusters among the plurality of clusters wherein the one or more anomalous clusters comprise a first set of anomalous cells, perform label selection to identify a second set of anomalous cells among cells in one or more remaining clusters that are not determined as anomalous by the cluster selection, combine the first and second sets of anomalous cells to identify a resulting set of anomalous cells among the plurality of cells, and indicate a Root Cause Analysis (RCA) for each anomalous cell in the resulting set of anomalous cells based on the input data of the DL KPIs of said anomalous cell. The label selection is based on the input data of DL KPIs of cells in the one or more remaining clusters, and a trained machine learning model previously obtained by supervised machine learning.

In some embodiments, a computer-readable medium including instructions that are executable by a computer to cause the computer to perform operations comprising clustering a plurality of cells into a plurality of clusters based on input data of a plurality of uplink (UL) key performance indicators (KPIs) of the plurality of cells, performing cluster selection to identify one or more anomalous clusters among the plurality of clusters, and indicating a Root Cause Analysis (RCA) for each cell in the one or more anomalous clusters, based on the input data of the UL KPIs of said anomalous cell.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method performed by at least one processor, and comprising:
   first determining, among a plurality of cells, a first set of cells that are anomalous, wherein said first determining is based on
      input data of a plurality of first features of each cell among the plurality of cells, and
      a first machine learning operation;
   second determining, among remaining cells of the plurality of cells that are not determined as anomalous by said first determining, a second set of cells that are anomalous, wherein said second determining is based on
      the input data of the plurality of first features of each cell among the remaining cells, and
      a second machine learning operation different from the first machine learning operation; and
   identifying a resulting set of anomalous cells among the plurality of cells, wherein the resulting set of anomalous cells is a combination of the first set and the second set of anomalous cells.

2. The method of claim 1, wherein
   said second determining is based on the input data of the plurality of first features of each cell among the remaining cells, without using the input data of the plurality of first features of each cell among the first set of cells.

3. The method of claim 1, wherein
   the first machine learning operation comprises unsupervised machine learning, and
   the second machine learning operation comprises supervised machine learning.

4. The method of claim 3, wherein
   the unsupervised machine learning comprises Hierarchical Agglomerative Clustering (HAC), and
   the supervised machine learning comprises Logistic Regression (LR).

5. The method of claim 1, wherein
   the plurality of first features comprises downlink (DL) key performance indicators (KPIs).

6. The method of claim 1, further comprising:
   third determining, among the plurality of cells, a third set of cells that are anomalous, wherein said third determining is based on
      input data of a plurality of second features of each cell among the plurality of cells, and
      a third machine learning operation different from the first and second machine learning operations;
   identifying a first Root Cause Analysis (RCA) for each anomalous cell in the resulting set of anomalous cells, based on the input data of the plurality of first features of said anomalous cell; and indicating a second Root Cause Analysis (RCA) for each anomalous cell in the third set of anomalous cells, based on the input data of the plurality of second features of said anomalous cell.

7. The method of claim 6, wherein
   the plurality of first features comprises downlink (DL) key performance indicators (KPIs),
   the plurality of second features comprises uplink (UL) KPIs.

8. The method of claim 7, wherein at least one of
   the DL KPIs comprise at least one selected from the group consisting of:
      Network Availability,
      Radio Access Bearer (ERAB) Setup Success Rate (SSR),
      ERAB Drop Rate,
      DL Physical Resource Block (PRB) Resource Utilization,
      DL Modulation and Coding Schemes (MCSs),
      Control Channel Element (CCE) Utilization,
      UL Traffic,
      DL Traffic, and
      Timing Advance (TA) Type 1, or
   the UL KPIs comprise at least one selected from the group consisting of:
      Network Availability,
      ERAB SSR,
      ERAB Success Rate,
      Quality of Service (QoS) Class Identifier (QCI) 9 and 5,
      UL Noise, and
      UL MCSs.

9. The method of claim 7, wherein
   the first machine learning operation comprises first unsupervised machine learning,
   the second machine learning operation comprises supervised machine learning,
   the third machine learning operation comprises second unsupervised machine learning different from the first unsupervised machine learning, and
   the supervised machine learning comprises training a machine learning model based on training data of the DL KPIs collected over a period of up to 60 days.

10. The method of claim 9, wherein
    the first unsupervised machine learning comprises Hierarchical Agglomerative Clustering (HAC),
    the supervised machine learning comprises Logistic Regression (LR), and
    the second unsupervised machine learning comprises Gaussian Mixture Model (GMM).

11. A cell anomaly detecting device, comprising at least one processor configured to:
    cluster a plurality of cells into a plurality of clusters, based on input data of a plurality of downlink (DL) key performance indicators (KPIs) of the plurality of cells,
    perform cluster selection to identify one or more anomalous clusters among the plurality of clusters, the one or more anomalous clusters comprising a first set of anomalous cells,
    perform label selection to identify a second set of anomalous cells among cells in one or more remaining clusters that are not determined as anomalous by the cluster selection, wherein said label selection is based on
       the input data of DL KPIs of the cells in the one or more remaining clusters, and a trained machine learning model previously obtained by supervised machine learning, combine the first and second sets of anomalous cells to identify a resulting set of anomalous cells among the plurality of cells, and identify a Root Cause Analysis (RCA) for each anomalous cell in the resulting set of anomalous cells, based on the input data of the DL KPIs of said anomalous cell.

12. The cell anomaly detecting device of claim 11, wherein the DL KPIs comprise at least one selected from the group consisting of:
Network Availability,
Radio Access Bearer (ERAB) Setup Success Rate (SSR),
ERAB Drop Rate,
DL Physical Resource Block (PRB) Resource Utilization,
DL Modulation and Coding Schemes (MCSs),
Control Channel Element (CCE) Utilization,
UL Traffic,
DL Traffic, and
Timing Advance (TA) Type 1.

13. The cell anomaly detecting device of claim 12, wherein the at least one processor is further configured to:
perform data pre-processing on the input data of the DL KPIs to obtain pre-processed data of a plurality of DL features derived from the DL KPIs, and
perform the cluster selection and the label selection, using the pre-processed data of the plurality of DL features,
wherein the plurality of DL features comprises at least one selected from the group consisting of:
Radio Network Availability Rate (%),
ERAB SSR (%),
Maximum User Equipment (UE) Number,
DL PRB Utilization,
Residual Block Error Rate (BLER) DL,
multiple DL MCSs (%) in corresponding non-overlapping ranges of DL MCS indices,
multiple CCE Utilizations (%) at corresponding aggregation levels (AGG), and
TA Distribution.

14. The cell anomaly detecting device of claim 13, wherein the at least one processor is further configured to:
perform the supervised machine learning on training data to obtain the trained machine learning model, based on a plurality of rules, wherein
a cell satisfying at least two of the plurality of rules is determined as anomalous, and
a cell satisfying less than two of the plurality of rules is determined as non-anomalous,
wherein the plurality of rules comprises at least one selected from the group consisting of:
ERAB SSR being less than a second threshold,
Residual BLER DL being greater than a third threshold,
DL MCS in a range of MCS indices from 23 to 26 being less than a fourth threshold,
TA Distribution being less than a fifth threshold, and
DL MCS in a range of MCS indices from 0 to 9 being greater than a sixth threshold, while CCE Utilization at AGG of 8 being greater than a seventh threshold.

15. The cell anomaly detecting device of claim 13, wherein the at least one processor is further configured to indicate RCA based on a plurality of rules comprising at least one selected from the group consisting of:
Radio Network Availability Rate being zero, corresponding to RCA being Zero Availability,
Residual BLER DL being greater than a first threshold, corresponding to RCA being High BLER,
DL MCS in a range of MCS indices from 0 to 9 being greater than a second threshold, corresponding to RCA being Bad DL MCS, and
CCE Utilization at AGG of 8 being greater than a fourth threshold, corresponding to RCA being High CCE Utilization.

16. A computer-readable medium including instructions that are executable by a computer to cause the computer to perform operations comprising:
clustering a plurality of cells into a plurality of clusters, based on input data of a plurality of uplink (UL) key performance indicators (KPIs) of the plurality of cells;
performing cluster selection to identify one or more anomalous clusters among the plurality of clusters; and
identifying a Root Cause Analysis (RCA) for each cell in the one or more anomalous clusters, based on the input data of the UL KPIs of said anomalous cell,
wherein, in the cluster selection,
a cluster satisfying at least two of a plurality of rules is determined as anomalous, and
a cluster satisfying less than two of the plurality of rules is determined as non-anomalous.

17. The computer-readable medium of claim 16, wherein the UL KPIs comprise at least one selected from the group consisting of:
Network Availability, Radio Access Bearer (ERAB) Setup Success Rate (SSR),
ERAB Success Rate at Quality of Service (QoS) Class Identifier (QCI) 9 and 5,
UL Noise, and
UL MCSs.

18. The computer-readable medium of claim 17, wherein the operations further comprise:
performing data pre-processing on the input data of the UL KPIs to obtain pre-processed data of a plurality of UL features derived from the UL KPIs, and
perform the cluster selection, using the pre-processed data of the plurality of UL features,
wherein the plurality of UL features comprises at least one selected from the group consisting of:
Radio Network Availability Rate (%),
ERAB SSR (%),
ERAB SSR for QCI 5,
ERAB SSR for QCI 9,
Maximum UE Number,
UL PRB Utilization,
Residual BLER UL,
multiple UL MCSs (%) in corresponding non-overlapping ranges of UL MCS indices,
DL MCS in a range of MCS indices from 23 to 26, and
Full Duplex (FD) UL Average Noise.

19. The computer-readable medium of claim 18, wherein in the cluster selection,
a cluster satisfying only one of the plurality of rules is determined as non-anomalous, and
the plurality of rules comprises at least one selected from the group consisting of:
ERAB SSR being less than a first threshold, and
FD UL Average Noise being greater than a third threshold.

20. The computer-readable medium of claim 18, wherein said indicating RCA for each anomalous cell is based on a plurality of further rules comprising at least one selected from the group consisting of:

Radio Network Availability Rate being zero, corresponding to RCA being Zero Availability, ERAB SSR being zero, corresponding to RCA being ERAB Failure, FD UL Average Noise being greater than a first threshold, corresponding to RCA being High UL Noise, and Residual BLER UL being greater than a second threshold, corresponding to RCA being High UL BLER.

* * * * *